2,928,843
BASIC ESTERS AND SALTS THEREOF

Minoo Dossabhoy Mehta, Kensington, London, and David Maxwell Brown, Betchworth, England, assignors to Beecham Research Laboratories Limited, Betchworth, Surrey, England, a British company No Drawing. Application December 3, 1957
Serial No. 700,293

Claims priority, application Great Britain
December 7, 1956

6 Claims. (Cl. 260—326.3)

This invention relates to basic esters and acid addition salts thereof.

According to the present invention it has been found that certain novel basic esters and acid addition salts thereof have a high local anaesthetic activity, which is in some instances as much as 25 to 35 times as great as procaine hydrochloride.

The novel compounds of the present invention are compounds of the general formula:

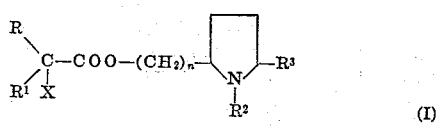

(I)

where R is a phenyl group and $R^1$ is a phenyl or cyclohexyl group, or R and $R^1$ are together the residue of a fluorene or xanthene ring system; $R^2$ is hydrogen or an alkyl group having not more than four carbon atoms; $R^3$ is a hydrogen atom or a methyl group; X is a hydroxyl group or an atom of hydrogen and n is 2, 3 or 4, and acid addition salts thereof.

Since the compounds of the present invention contain at least one asymmetric centre they can exist in at least two optically active forms and the present invention extends to those optically active forms as well as to the racemic forms.

Compounds of this invention which are of considerable interest on account of their value as local anaesthetics are those of the general formula:

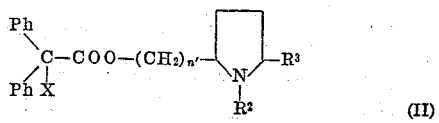

(II)

where Ph is a phenyl group, $R^2$ is a hydrogen atom or an alkyl group having not more than four carbon atoms; $R^3$ is a hydrogen atom or a methyl group and $n'$ is 2 or 3, and their acid addition salts.

The compounds of this invention which are of particular interest are those of the general Formula II above were $R^2$ is an alkyl group having not more than 4 carbon atoms (especially a methyl, ethyl or n-propyl group), $R^3$ is a hydrogen atom and $n'$ is 2 or 3. Four compounds included in this latter group are given below together with values of their actvity as local anaesthetics compared with procaine hydrochloride as unity.

| Compound: | Activity |
|---|---|
| β-(1-ethyl-2-pyrrolidyl)ethyl benzilate hydrochloride. | 26.0 |
| β-(1:5-dimethyl-2-pyrrolidyl)ethyl benzilate hydrochloride | 28.0 |
| β-(1-n-propyl-2-pyrrollidyl)ethyl benzilate hydrochloride | 36.0 |
| γ-(1-methyl-2-pyrrolidyl)propyl benzilate hydrochloride | 29.0 |

The compounds of the present invention are also useful as intermediates for the production of the basic esters of our copending United Kingdom application No. 1022/57.

The present invention also includes a process for the preparation of compounds of the general Formula I above in which an alcohol of general formula:

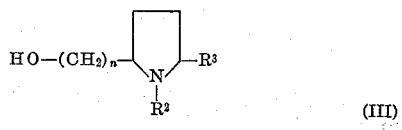

(III)

is esterified with an acid halide of general formula:

(IV)

where R, $R^1$, $R^2$, $R^3$, X and n have the meanings given above and X' is an atom of hydrogen, chlorine or bromine and Y is an atom of chlorine or bromine to produce a compound of the general formula:

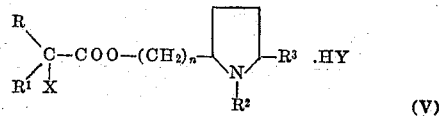

(V)

which is treated with a base and, where X' is an atom of chlorine or bromine, is also treated with water. The compounds of the general Formula V are new compounds.

The treatment of the halogen compound of the general Formula V with water according to the process of this invention can conveniently be achieved by allowing the halogen compound to stand in water. It has been found in several instances, including the processes described in Examples 7, 8 and 9 below, that the treatment of a halogen compound of the general Formula V with water can conveniently be achieved by dissolving the halogen compound in water and allowing the resulting solution to stand at room temperature for about 30 minutes. It is usually preferable to treat the halogen compound of the general Formula V first with water to obtain the corresponding hydroxy compound and then to treat the latter with the base. Suitable bases include aqueous solutions of alkalis, for example sodium hydroxide.

The compounds of general Formula I can be obtained alternatively by a process in which an acid of the general formula:

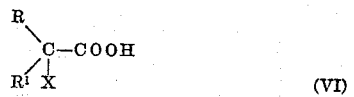

(VI)

or one of its salts, preferably a salt of an alkali metal, for example sodium, is reacted with a compound of the general formula:

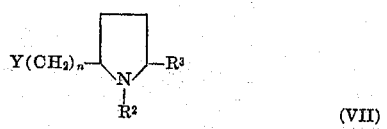

(VII)

where R, $R^1$, $R^2$, $R^3$, X, Y and n have the meanings given above. The product formed where an acid of the general Formula VI is used is a hydrohalide salt which may be used as such or converted into the corresponding free base of the general Formula I by normal procedures, whereas when a salt of an acid is used a compound of the general Formula I is produced directly.

A further process for the preparation of compounds of the general Formula I is one in which an ester of general formula:

(VIII)

is reacted with a pyrrolidyl alcohol of general formula:

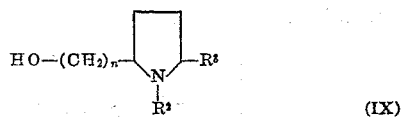
(IX)

where R, $R^1$, $R^2$, $R^3$, X and $n$ have the meanings given to them above and $R^4$ is an alkyl group having from 1 to 4 carbon atoms and is especially a methyl or ethyl group. The process can be conveniently carried out by heating the ester with an excess of the alcohol. The heating is preferably carried out in the presence of a small amount of an alkali metal alkoxide, for example a sodium alkoxide and so arranged that the lower alcohol produced in the process distills off as it is produced.

The anion of the salts of this invention can be chosen from any of the usually acceptable anions, for example, halide, sulphate, citrate or tartrate, the choice depending to a large extent upon pharmaceutical convenience and the physical properties which it is desired the salt to possess, for example, stability or solubility. Of course, toxic anions, for example the oxalate ion, should be avoided. Where the salt is an acid addition salt derived from an organic acid it is preferably prepared by treating the corresponding free base with the appropriate organic acid in a suitable solvent.

The following examples illustrate the invention:

Example 1.—β-(1-methyl-2-pyrrolidyl)ethyl diphenylacetate

A solution of 1-methyl-2-(2-hydroxyethyl) pyrrolidine (7.1 g.) in dry benzene (10 cc.) was added dropwise with shaking, to a solution of diphenylacetyl chloride (12.7 g.) in dry benzene (50 cc.), care being taken to keep the temperature of the reaction below 30° C. The whole was then allowed to stand overnight at room temperature. The solvent was removed in vacuo to give a yellow gum which on trituration with dry ether (100 cc.) gave the crude ester hydrochloride as a colourless hygroscopic solid (12.8 g.—65%).

This hydrochloride on basification with aqueous 30% potassium hydroxide solution yielded the free base as an amber-coloured viscous oil, B.P. 165° C./0.05 mm. (bath temp. 217° C.), $n_D^{23}$ 1.5521. (Found: C, 77.8; H, 7.7; N, 4.3. $C_{21}H_{25}O_2N$ requires: C, 78.0; H, 7.7; N, 4.3%.)

The 1-methyl-2-(2-hydroxyethyl)pyrrolidine required for the above and following examples was prepared by the following modifications of known synthetic methods.

Ethyl diazoacetate (35 g.) was added dropwise to a well-stirred mixture of 1-methylpyrrole (70 g.) and copper bronze (3 g.) heated on a steam bath. The internal temperature of the reaction mixture was maintained at 95-100° C. and after the addition was complete the whole was heated on the steam bath for a further ten minutes and then filtered. The filtrate was then fractionated in vacuo (3-4 mm.) to give a forerun of 1-methylpyrrole (53.2 g.) and then ethyl 1-methyl-2-pyrrylacetate as a pale yellow oil (18 g.), B.P. 84-88° C./3 mm. The yield taking into account the recovered 1-methylpyrrole was 51% (cf. Nenitzescu and Solomonica, Ber., 1931, 64, 1924).

Ethyl 1-methyl-2-pyrrylacetate (50.7 g.) in glacial acetic acid (75 cc.) was hydrogenated at 45 atmospheres at room temperature for 16 hours in the presence of a platinum oxide catalyst. The catalyst was then removed by filtration and the acetic acid was neutralised using aqueous saturated potassium carbonate solution (ca. 120 cc.). Potassium acetate separated and sufficient anhydrous potassium carbonate (66 g.) was added to saturate the aqueous layer. The inorganic material was removed by filtration and washed with ether (4×50 cc.). The filtrate together with the ether washing was separated and the aqueous layer was further extracted with ether (4×250 cc.). The combined ether extracts were dried (MgSO₄), the ether removed by distillation and the residual oil distilled in vacuo, the fraction (35.5 g.), B.P. 64-67° C./1.5 mm. being collected. On redistillation ethyl 1-methyl-2-pyrrolidyl acetate (34 g.—65%) was obtained as a colourless liquid, B.P. 65-66° C./2.5 mm. $n_D^{19}$ 1.4464 (cf. Sohl and Shriner, J. Amer. Chem. Soc., 1933, 55, 3831).

Lithium aluminium hydride (3.5 g.) was added to dry ether (500 cc.) under an atmosphere of nitrogen and a solution of ethyl 1-methyl-2-pyrrolidyl acetate (14.5 g.) in dry ether (50 cc.) was slowly run in with stirring at such a rate that the ether refluxed gently. After complete addition (ca. 0.5 hour), the mixture was refluxed with stirring for 0.5 hour and then cooled to 0° C. The complex was then decomposed by the careful addition of water (18 cc.) the mixture being stirred for 0.5 hour to ensure complete decomposition. The ethereal solution was filtered, the inorganic residue was washed with ether (4×80 cc.) and the combined filtrate and washings dried (MgSO₄). The ether was removed by distillation and the residue on distillation in vacuo gave 1-methyl-2-(2-hydroxyethyl)pyrrolidine (7.1 g.—65%) as a colourless liquid, B.P. 67° C./1.9 mm. $n_D^{25}$ 1.4698 (cf. Hess et al., Ber., 1915, 48, 1886).

Example 2.—β-(1-methyl-2-pyrrolidyl)ethyl benzilate hydrochloride

A solution of β-(1-methyl-2-pyrrolidyl)ethyl diphenylchloroacetate hydrochloride (3.45 g.) (prepared as described in Example 12) in water (70 cc.) was allowed to stand at room temperature for twenty-five minutes. Sodium chloride (24.6 g.) was added and the solution extracted with chloroform (6×40 cc.). The chloroform extracts were dried by means of MgSO₄ and the solvent removed in vacuo when a gum was obtained. The latter on crystallisation from ethanol-ether mixture yielded β-(1-methyl-2-pyrrolidyl)ethyl benzilate hydrochloride (1.9 g.—58%) as colourless prisms, M.P. 134° C. (Found: C, 66.9; H, 6.8; N, 4.0. $C_{21}H_{26}O_3NCl$ requires: C, 67.1; H, 6.9; N, 3.7%.)

Treatment of the hydrochloride dissolved in water with aqueous potassium hydroxide gave an oil which rapidly solidified and was collected and crystallised from light petroleum (B.P. 60–80° C.) to give colourless needles of the free base, M.P. 82–83° C. (Found: C, 74.3; H, 7.2; N, 4.2. $C_{21}H_{25}O_3N$ requires: C, 74.4; H, 7.4; N, 4.1%.)

Example 3.—β-(1-methyl-2-pyrrolidyl)ethyl-fluorene-9-carboxylate hydrochloride

Fluorene-9-carbonyl chloride (8.86 g.) was dissolved in chloroform (60 cc.) and a solution of 1-methyl-2-(2-hydroxyethyl)pyrrolidine (5 g.) in chlorofrom was added dropwise with shaking during 0.5 hour, care being taken to keep the temperature of the reaction below 35° C. After allowing the solution to stand at room temperature for 0.5 hour the solvent was removed in vacuo at a bath temperature not exceeding 40° C. The residual gum was washed with dry ether (2×100 cc.) and on crystallisation from ethanol-ether yielded the hydrochloride of the ester as colourless oblong prisms, M.P. 164° C. (decomp.). (The melting point appeared to depend upon the rate of heating.) (Found: C, 69.9; H, 6.6; N, 3.9. $C_{21}H_{24}O_2NCl$ requires: C, 70.5; H, 6.7; N, 3.9%.)

Example 4.—β-(1-methyl-2-pyrrolidyl)ethyl xanthene-9-carboxylate hydrochloride

A solution of 1-methyl-2-(2-hydroxyethyl)pyrrolidine (2.3 g.) in dry ether (200 cc.) was added slowly over 20 minutes to a stirred solution of xanthene-9-carbonyl chloride (4.35 g.) in dry ether (200 cc.). After allowing to stand overnight at room temperature the separated solid (5.3 g.—80%), M.P. 182–185° C. (decomp.) was collected. Recrystallisation from dry ethanol-ether gave the ester hydrochloride as colourless needles, M.P. 197–198° C. (decomp.). Found: C, 67.1; H, 6.5; N, 3.9. $C_{21}H_{24}O_3NCl$ requires: C, 67.5; H, 6.4; N, 3.8%.) An aqueous solution of the hydrochloride (5 g.) on treatment with aqueous saturated potassium carbonate solution gave the free base as a yellow oil (4.3 g.).

Example 5.—β-(1-methyl-2-pyrrolidyl)ethyl phenylcyclohexylglycollate hydrochloride A solution of phenylcyclohexylglycollic acid (8.9 g.) and 1-methyl-2-(2-chloroethyl)pyrrolidine (7 g.) in isopropanol (20 cc.) was refluxed for 24 hours. The solvent was then removed in vacuo and the residual gum shaken with ether (50 cc.) and dilute hydrochloric acid (50 cc. of 1 N). The aqueous layer was extracted with ether (2×25 cc.) and the ether extracts discarded. It was then made strongly alkaline using 40% aqueous sodium hydroxide solution, the product extracted with ether, and the extracts dried ($MgSO_4$). After removal of the solvent the residual oil gave the ester base as a yellow oil (3.7 g.—44%), B.P. 180° C./0.4 mm. Treatment with ethereal hydrogen chloride gave the hydrochloride which crystallised as clusters of colourless needles, M.P. 175° C. from isopropanol ether. (Found: C, 66.2; H, 8.6; N, 4.0. $C_{21}H_{32}O_3NCl$ requires: C, 66.1; H, 8.4; N, 3.7%.)

1-methyl-2-(2-chloroethyl)pyrrolidine was obtained as a colourless liquid, B.P. 37–38° C./1.3 mm. $n_D^{20}$ 1.4512 by the action of thionyl chloride on 1-methyl-2-(2-hydroxyethyl)pyrrolidine.

Example 6.—β-(1-ethyl-2-pyrrolidyl)ethyl diphenylacetate

Reaction of 1-ethyl-2-(2-hydroxyethyl)pyrrolidine (5 g.) in dry benzene (20 cc.) with diphenylacetyl chloride (8.86 g.) in dry benzene (100 cc.) as in Example 1 gave a viscous amber-coloured oil (6.5 g.—55%) B.P. 168° C./0.03 mm. $n_D^{19.5}$ 1.5511. (Found: C, 78.1; H, 8.0; N, 4.3. $C_{22}H_{27}O_2N$ requires: C, 78.4; H, 8.0; N, 4.2%.)

The 1-ethyl-2-(2-hydroxyethyl)pyrrolidine was obtained as a colourless liquid, B.P. 88–89° C./4.5 mm. $n_D^{19}$ 1.4738 as described in Example 1 using 1-ethylpyrrole as starting material.

Example 7.—β-(1-ethyl-2-pyrrolidyl)ethyl benzilate hydrochloride

A solution of 1-ethyl-2-(2-hydroxyethyl)pyrrolidine (5 g.) in dry benzene (20 cc.) was added dropwise with stirring to a solution of α-chlorodiphenylacetyl chloride (10.2 g.) in dry benzene (100 cc.), care being taken to keep the temperature during the addition below 35° C. The reaction mixture was stood overnight at 0° C. and after removal of benzene in vacuo the ester hydrochloride was obtained as a light amber-coloured gum which on refluxing with dry ether (2×120 cc.) and trituration with dry ether solidified to give the crude hydrochloride (12.4 g.). The latter was purified by crystallisation from butanone when the β-(1-ethyl-2-pyrrolidyl)ethyl diphenylchloroacetate hydrochloride (6.2 g.—44%) was obtained as a colourless solid, M.P. 112° C.

β-(1-ethyl-2-pyrrolidyl)ethyl benzilate hydrochloride was obtained therefrom by the method used in Example 2 as colourless prisms (89%), M.P. 151° C. (Found: C, 68.1; H, 7.3; N, 3.8. $C_{22}H_{28}O_3NCl$ requires: C, 67.8; H, 7.2; N, 3.6%.)

Example 8.—β-(1:5-dimethyl-2-pyrrolidyl)ethyl benzilate hydrochloride

A solution of 1:5-dimethyl-2-(2-hydroxyethyl) pyrrolidine (5.3 g.) in dry ether (100 cc.) was added with stirring to a solution of α-chlorodiphenyl acetyl chloride (9.8 g.) in dry ether (300 cc.) 0.5 hour. After allowing to stand overnight at room temperature, the ethereal layer was decanted and the residual gum on trituration with dry ethanol (ca. 20 cc.) solidified and collected. Crystallisation from isopropanol-ether, gave β-(1:5-dimethyl-2-pyrrolidyl)ethyl diphenylchloroacetate hydrochloride (3.75 g.) as colourless needles, M.P. 153–155° C., which when treated with water (80 cc.) as in Example 2 gave β-(1:5-dimethyl-2-pyrrolidyl)ethyl benzilate hydrochloride (3.4 g.—95%) as colourless rods, M.P. 179–180° C. (Found: C, 67.4; H, 7.4; N, 3.5. $C_{22}H_{28}O_3NCl$ requires: C, 67.8; H, 7.2; N, 3.6%.)

The 1:5-dimethyl-2-(2-hydroxyethyl)pyrrolidine required for this example was prepared as a colourless liquid, B.P. 68–72° C./1.5 mm. $n_D^{19}$ 1.4714 by the method described in Example 1, using 1:2-dimethylpyrrole as the starting material.

Example 9.—β-(1-n-propyl-2-pyrrolidyl)ethyl benzilate

A solution of 1-n-propyl-2-(2-hydroxyethyl)pyrrolidine (3.3 g.) in dry benzene (50 cc.) was reacted with α-chlorodiphenylacetyl chloride (5.56 g.) in dry benzene (50 cc.) as in Example 7 to give the gummy chloro compound which was hydrolysed with water as in Example 2. Treatment of the aqueous solution with sodium hydroxide gave the free base as a viscous yellow oil (3.0 g.—42%), B.P. 156–157° C./5×10⁻⁴ mm. $n_D^{23}$ 1.5494. (Found: C, 75.2; H, 8.0; N, 4.1. $C_{23}H_{29}O_3N$ requires: C, 75.2; H, 7.9; N, 3.8%.) Ethanolic hydrogen chloride in ethyl acetate gave a hydrochloride which crystallised from ethylacetate/methanol/ether as colourless needles, M. P. 148–149° C. (Found: C, 68.1; H, 7.3; Cl, 8.7. $C_{23}H_{30}NCl$ requires: C, 68.4; H, 7.4; Cl, 8.8%.) The 1-n-propyl-2-(2-hydroxyethyl)pyrrolidine required in this example was prepared as described in Example 1 using 1-n-propylpyrrole as the starting material. It was obtained as a colourless liquid, B.P. 91° C./1 mm. $n_D^{24}$ 1.4685.

Example 10.—β-(2-pyrrolidyl)ethyl benzilate 1-benzyl-2-(2-hydroxyethyl)pyrrolidine (8 g.) was reacted with α-chlorodiphenylacetyl chloride (15.2 g.) in dry chloroform as in Example 7. An aqueous solution of the product was allowed to stand for 1 hour at room temperature and then treated with 40% aqueous sodium hydroxide solution to give the crude β-(1-benzyl-2-pyrrolidyl)ethyl benzilate (12.7 g.) as a viscous yellow oil. Hydrogenation of a solution of this material in glacial acetic acid (55 cc.) at an initial pressure of 66 lbs./sq. in., using 10% palladium on charcoal (4 g.) gave β-(2-pyrrolidyl)ethyl benzilate as a colourless solid (3.8 g.—38%), M.P. 120–121° C. Crystallisation from petroleum ether (B.P. 80–100° C.) gave colourless prisms, M.P. 125° C. (Found: C, 74.1; H, 7.2; N, 4.4. $C_{20}H_{23}O_3N$ requires: C, 73.8; H, 7.0; N, 4.3%.) Ethanolic hydrogen chloride gave a hydrochloride as colourless needles, M.P. 143–144° C. from ethanol/ether. (Found: C, 66.5; H, 7.0; Cl, 9.3. $C_{20}H_{24}O_3NCl$ requires: C, 66.4; H, 6.6; Cl, 9.8%.) The 1-benzyl-2-(2-hydroxyethyl)pyrrolidine required for this example was prepared as a colourless oil, B.P. 108–110° C./0.25 mm. $n_D^{20}$ 1.5112 by reacting benzyl bromide with ethyl-2-pyrrolidyl acetate in toluene in the presence of anhydrous potassium carbonate. Ethyl-2-pyrrolidyl acetate was obtained as a colourless liquid, B.P. 83–85° C./2.3 mm., $n_D^{25}$ 1.4560 by the hydrogenation of ethyl-2-pyrrolacetate which in its turn was prepared by the action of ethyl diazoacetate on pyrrole, the procedure in both cases being the same as described in Example 1.

Example 11.—γ-(1-methyl-2-pyrrolidyl)propyl benzilate

A solution of 1-methyl-2-(3-hydroxypropyl)pyrrolidine (3 g.) in dry chloroform (30 cc.) was reacted with α-chlorodiphenylacetyl chloride (6.3 g.) in dry chloroform (80 cc.) as in Example 7. Treatment of the gummy product as in Example 10 gave γ-(1-methyl-2-pyrrolidyl)propyl benzilate (6.6 g.—88%) as a colourless solid, M.P. 83–84° C. Crystallisation from petroleum ether (B.P. 60–80° C.) gave colourless needles, M.P. 84° C. (Found: C, 74.9; H, 7.8. $C_{22}H_{27}O_3N$ requires: C, 74.8; H, 7.7%.) Ethanolic hydrogen chloride gave a hydrochloride as colourless needles, M.P. 122° C. from butanone-petroleum ether (B.P. 60–80° C.). (Found: C, 67.6; H, 7.1; Cl, 9.4. $C_{22}H_{28}ONCl$ requires: C, 67.8; H, 7.2; Cl, 9.1%.)

The 1-methyl-2-(3-hydroxypropyl)pyrrolidine required for this example was prepared as a colourless liquid, B.P. 101° C./1.5 mm., $n_D^{25}$ 1.4698 by the formic acid/formaldehyde methylation of 2-(3-hydroxypropyl)pyrrolidine. The latter intermediate was obtained by the action of lithium aluminium hydride on 5-(2-methoxycarbonylethyl)-2-pyrrolidone, a known compound (Leonard et al., J. Amer. Chem. Soc., 1947, 69, 692) in tetrahydrofuran. It was obtained as a colourless viscous liquid, B.P. 118° C./4.5 mm. (M.P. ca. 30° C.).

*Example 12.—β-(1-methyl-2-pyrrolidyl)ethyl diphenyl-chloroacetate hydrochloride*

A solution of 1-methyl-2-(2-hydroxyethyl)pyrrolidine (4.77 g.) in dry toluene (20 cc.) was added dropwise with shaking to a solution of α-chlorodiphenylacetyl chloride (9.27 g.) in dry toluene (50 cc.) at room temperature. The solution became turbid and at the end of about fifteen minutes, a heavy oil had separated out. The toluene layer was decanted and the residual gum washed with more dry toluene (ca. 50 cc.). The combined toluene layers deposited some of the crude hydrochloride, the main crop, however, being obtained from the gum of trituration with dry ethanol (ca. 10 cc.), the total yield being 7.54 g. (55%). This was crystallised from butanone and was obtained as colourless prisms, M.P. 109–110° C. (Found: C, 63.7; H, 6.7; N, 3.5. $C_{21}H_{25}O_2NCl_2$ requires: C, 63.9; H, 6.3; N, 3.6%.)

What we claim is:

1. A compound selected from the group consisting of basic esters of the general formula:

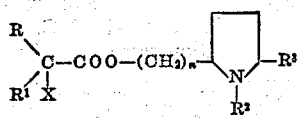

and non-toxic pharmaceutically acceptable acid addition salts thereof, where R is a phenyl group, and $R^1$ is selected from the group consisting of phenyl and cyclohexyl groups, R and $R^1$ together being otherwise a residue selected from the group consisting of fluorene and xanthene ring systems, $R^2$ is selected from the group consisting of hydrogen and alkyl groups having less than five carbon atoms, $R^3$ is selected from the group consisting of hydrogen and the methyl group, X is selected from the group consisting of hydrogen and the hydroxyl group and n is an integer of from 2 to 4 inclusive.

2. Compounds of the general formula:

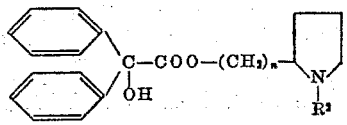

where $R^2$ is an alkyl group having less than five carbon atoms and n is an integer of from 2 to 3 inclusive.

3. β-(1-ethyl-2-pyrrolidyl)ethyl benzilate hydrochloride.

4. β-(1:5-dimethyl-2-pyrrolidyl)ethyl benzilate hydrochloride.

5. β-(1-n-propyl-2-pyrrolidyl)ethyl benzilate.

6. γ-(1-methyl-2-pyrrolidyl)propyl benzilate.

References Cited in the file of this patent
UNITED STATES PATENTS

| | | |
|---|---|---|
| 1,987,546 | Blankart | Jan. 8, 1935 |
| 2,394,770 | Hill et al. | Feb. 12, 1946 |
| 2,399,736 | Holmes et al. | May 7, 1946 |
| 2,695,301 | Blicke | Nov. 23, 1954 |
| 2,844,591 | Feldkamp et al. | July 22, 1958 |